(12) United States Patent
Falcon

(10) Patent No.: US 7,036,266 B2
(45) Date of Patent: *May 2, 2006

(54) WEIGHTED SHANK FISH HOOKS

(76) Inventor: Wayne J. Falcon, 112 Plainview Dr., Lafayette, LA (US) 70508

( * ) Notice: Subject to any disclaimer, the term of this patent is extended or adjusted under 35 U.S.C. 154(b) by 0 days.

This patent is subject to a terminal disclaimer.

(21) Appl. No.: 10/654,825

(22) Filed: Sep. 4, 2003

(65) Prior Publication Data

US 2004/0098902 A1     May 27, 2004

Related U.S. Application Data

(60) Provisional application No. 60/407,807, filed on Sep. 4, 2002.

(51) Int. Cl.
*A01K 83/00*     (2006.01)

(52) U.S. Cl. .................................... 43/44.81

(58) Field of Classification Search ............ 43/44.81, 43/44.8, 44.83, 43.1, 43.16, 42.39
See application file for complete search history.

(56) References Cited

U.S. PATENT DOCUMENTS

| 83,681 A | 11/1868 | Albee | |
|---|---|---|---|
| 148,926 A | 3/1874 | Cahoon | |
| 167,687 A | 9/1875 | Pitcher | |
| 1,295,370 A | 2/1919 | Porter | |
| 2,185,666 A * | 1/1940 | Hill, Jr. ................... | 43/43.13 |
| 2,775,842 A | 1/1957 | McCode | |
| 4,530,180 A * | 7/1985 | Gwaldacz et al. ......... | 43/42.28 |
| 4,819,366 A | 4/1989 | Manno | |
| 4,862,632 A * | 9/1989 | Kattenberg ................ | 43/43.16 |
| 5,220,743 A * | 6/1993 | McClellan ................. | 43/44.81 |
| 5,335,443 A * | 8/1994 | Grigsby, Jr. ............... | 43/44.81 |
| 5,901,494 A * | 5/1999 | Reed ......................... | 43/44.81 |
| 6,519,895 B1 * | 2/2003 | Bennett ..................... | 43/44.81 |
| 6,691,449 B1 * | 2/2004 | Hoben ....................... | 43/43.16 |

OTHER PUBLICATIONS

Lucarelli, Steve, "A Better Mousetrap?" Inside Line, Mar./Apr. 2003, p. 40.
BaseFan, "Bait-Jerker, Wacky Hooks," product review dated Mar. 4, 2004, http://www.basefan.com/reviews_article.asp?ID=39.
Bruhl, Jeff, "Falcon Lures," product review, http://www.probass.com/protips/JeffBruhl/jb20.php.

* cited by examiner

*Primary Examiner*—Teri Pham Luu
*Assistant Examiner*—Susan C. Alimenti
(74) *Attorney, Agent, or Firm*—Haynes and Boone, LLP; Randall C. Brown

(57) ABSTRACT

Weighted fish hooks having a hook shank having a bend at one end and a hook eye at an opposite end. A double-tapered weight is provided on the hook shank between the bend and the hook eye. The double-tapered weight has a top weight taper and a lower weight taper. The weighted fish hooks are at least partially embedded in a lure.

11 Claims, 4 Drawing Sheets

Fig. 5
Fig. 6
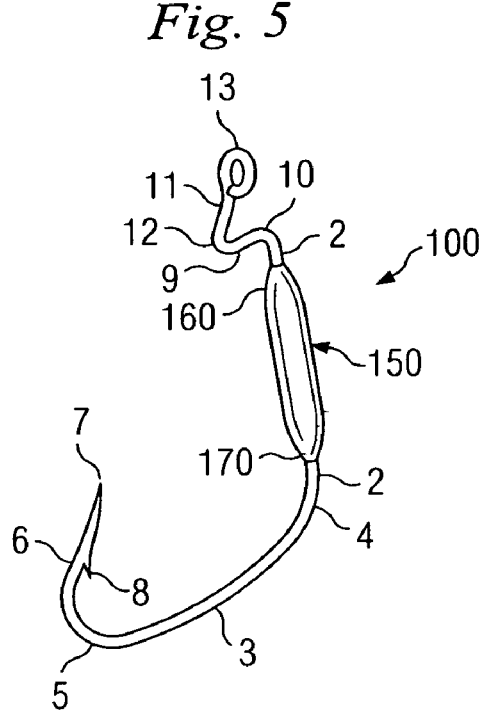
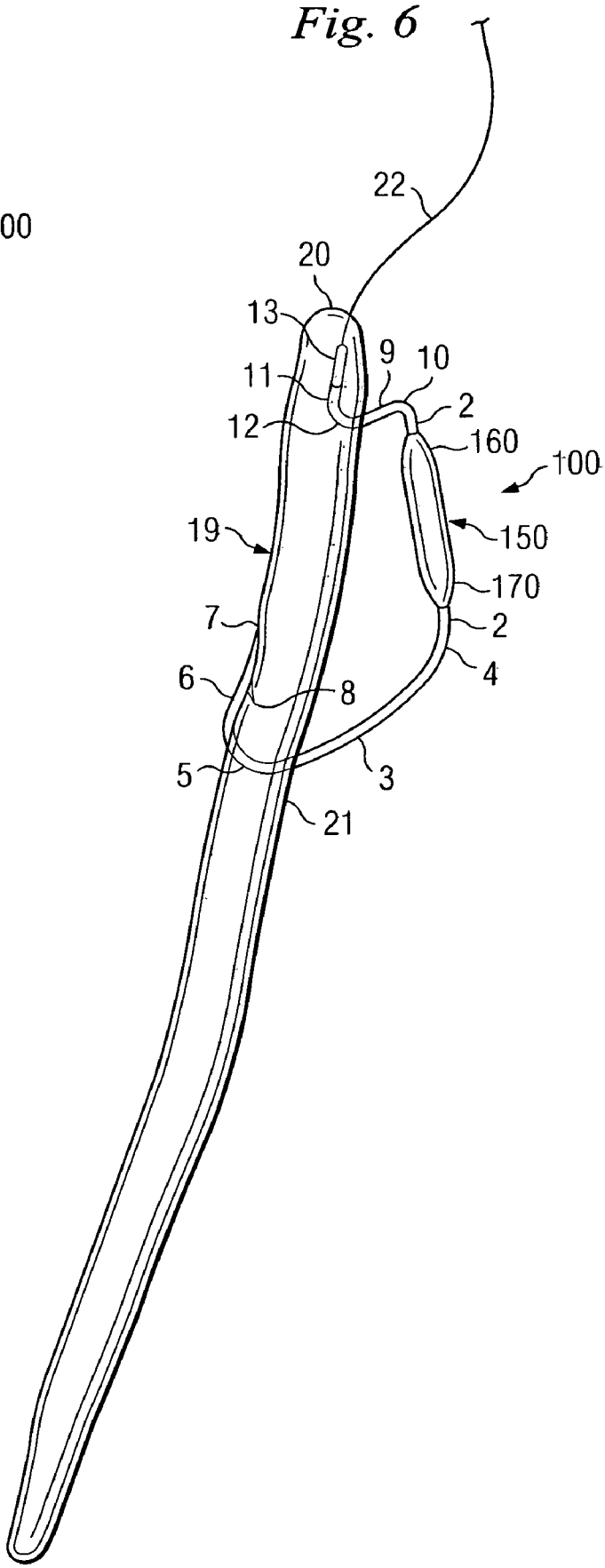

Fig. 7
Fig. 8
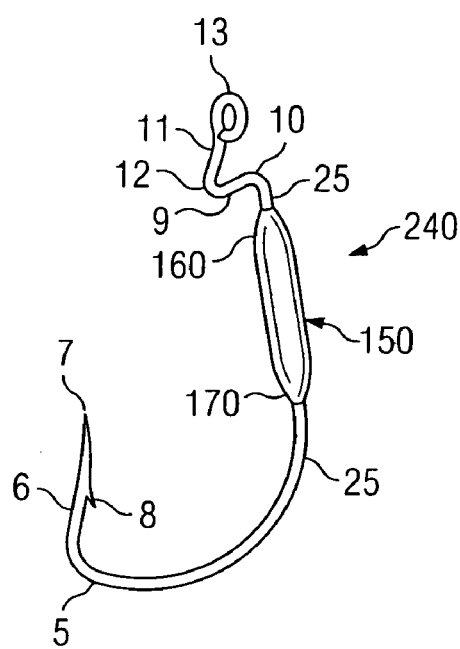
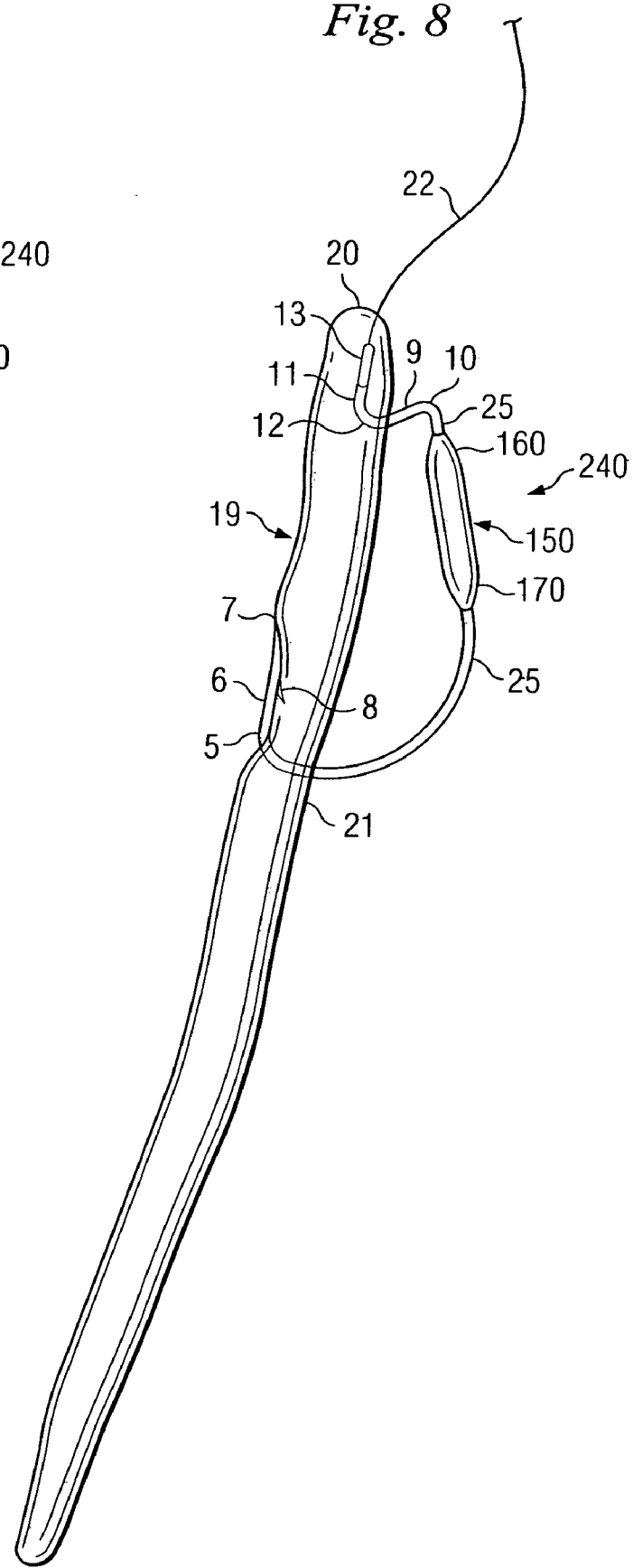

WEIGHTED SHANK FISH HOOKS

This application is a non-provisional of U.S. Provisional Application Ser. No. 60/407,807 filed Sep. 4, 2002, and is related to co-filed and co-pending U.S. application Ser. No. 10/655,446, filed Sep. 4, 2003.

BACKGROUND OF THE INVENTION

1. Field of the Invention

This invention relates to fishing lures and more particularly, to specially designed fish hooks, each having a low profile, double-tapered weight on the hook shank for use with flexible plastic fishing lures. These lures are impaled on an offset shank and reverse shank bend of the fish hooks, such that the tip and barb of the fish hooks may be embedded in or positioned against the plastic fishing lures to render the lures weedless for retrieval in a waterbody using a rod and reel. According to one embodiment, a low profile, double-tapered weight is applied to a straight shank of a fish hook to facilitate passage of the weight through the impaled lure with minimum lure damage during rigging and sinking of the hook and impaled lure to a desired depth determined by the lure design and speed of retrieval of the lure. According to another embodiment, a low profile, double-tapered weight is applied to a curved shank of a fish hook, and the hook is adapted for partial embedment in a flexible plastic fishing lure to achieve the same result.

2. Description of the Prior Art

One of the most effective lures in taking game fish, including the fresh water variety such as large mouth and small mouth bass, crappie and the like, as well as saltwater varieties, including red fish, speckled trout and similar fish, is the flexible plastic lure which can be molded in substantially any desired size, shape, color and consistency. A popular technique for retrieving plastic fishing lures at a desired depth in a waterbody is to embed a hook in the soft plastic of the fishing lure and place a weight or sinker on the line or on the hook shank, typically at the very top or bottom thereof, to cause the flexible plastic fishing lure to sink to a desired depth before and during retrieval. Retrieval of flexible plastic fishing lures rigged in this manner is typically effected by initially lifting, and subsequently lowering the tip of the fishing rod and intermittently operating the reel to facilitate raising and falling of the lure, causing the flexible plastic fishing lure to assume a swimming appearance. Accordingly, the action of the weight on the hook allows the lure to be fished directly on the bottom of the waterbody, where the lure is typically bounced off the bottom in a swimming or crawling simulation, or fished at the surface or an intermediate depth, depending upon the lure design and speed of retrieval. Problems with conventional sinkers and weights attached to the fishing line and the shanks of the hooks in prior art hooks include snagging or catching of the sinker on underwater obstacles such as moss, rocks, tree limbs, stumps, grass, weeds and the like when a lure is fished on the bottom and improper balancing of the impaled lure in the water during retrieval. The balancing problem includes excessive rate of sinking in the case of slip sinkers placed on the fishing line and excessive weight of improper shape placed on the hook shank in the wrong place.

Typical of the prior art weighted hook devices is the "Mustad FIN-ACKY" (trademark) which includes a straight shank that curves to a reverse bend for embedment in the plastic fishing lure and includes a weight added to the top of the hook shank for causing the weighted fishing lure to sink to a desired depth in a waterbody. An early fishing line hook and sinker is detailed in U.S. Pat. No. 83,681, patented Nov. 3, 1868. Other patents detailing various types of hooks with sinkers include U.S. Pat. No. 148,926, patented Mar. 24, 1874 to M. V. Cahon; U.S. Pat. No. 1,295,370, patented Feb. 25, 1919 to F. A. Porter; U.S. Pat. No. 167,687, dated Sep. 14, 1875, to Pitcher; U.S. Pat. No. 2,185,666, patented Jan. 2, 1940 to A. D. Hill, Jr.; U.S. Pat. No. 2,775,842, dated Jan. 1, 1957, to T. McCade; U.S. Pat. No. 4,819,366, patented Apr. 11, 1989 to J. T. Manno; U.S. Pat. No. 5,220,743, dated Jun. 22, 1993, to McClellan; and U.S. Pat. No. 5,901,494, dated May 11, 1999 to Herb Reed.

It has been found in the course of this invention that a low-profile, double-tapered weight can be applied to a curved or straight shank fishing hook to facilitate embedment of portions of the hook in a flexible plastic fishing lure, and fishing of the hook and lure at a desired depth in an easily controlled manner. Preferably, the low-profile, double-tapered weight is applied to the shank of the hook at a location between a bend in one end of the shank and the opposite end of the shank from the bend. It has further been found that the low profile, double-tapered weight located on the shank serves the purpose of improving the lure rigging and preventing, or at least greatly minimizing, snagging of the lure and the partially embedded hook on underwater obstacles such as moss, weeds, rocks, tree limbs and the like and facilitates a much smoother retrieval, whether the lure is being bounced off the bottom in heavy brush, rocks or the like, or retrieved on the surface or at an intermediate depth through the waterbody. Furthermore, placement of the streamlined, low-profile double-tapered weight on the hook shank near the end of the shank opposite the bend in the shank effects a surprisingly natural sinking of the hook-impaled lure, slightly head-down and with a slow descent, as well as a more natural "swimming action" of the lure due to minimum water resistance from the double-tapered, low profile weight.

It is therefore an object of this invention to provide new and improved, fish hooks comprising a double-tapered weight attached to the shank for causing the hooks and lures in which the hooks are partially embedded, to sink at a desired rate to a desired retrieval depth, which depth is determined primarily by the weight size and speed of retrieval of the hooks and lures through a waterbody.

Another object of this invention is to provide a straight shank fish hook for embedment in the body portion of a flexible plastic fishing lure such as a flexible plastic worm, which hook includes a straight shank fitted with a low profile, double-tapered weight, an extended shank bend provided at one end of the straight shank to define an extended shank, a reverse bend provided in the extended shank to define a reverse bend neck, a hook top and a hook barb. At the opposite end of a straight shank above the weight there is provided an offset shank defined by a shank offset bend that defines the shank offset and a shank neck bend that terminates in a hook eye.

Yet another object of this invention is to provide a curved shank fish hook for partial embedment in flexible plastic fishing lures such as flexible plastic worms, which fish hook includes a curved shank segment fitted with a low profile, double-tapered weight. A reverse bend terminates the curved shank to define a reverse bend neck, which terminates in a hook top and a hook barb. The opposite end of the curved shank, like the straight shank fish hook, terminates in a shank offset bend, a shank offset, a shank neck bend and a shank neck, which terminates in a hook eye.

SUMMARY OF THE INVENTION

These and other objects of the invention are realized in new and improved weighted fish hooks which include, according to one embodiment, a straight shank weighted fish hook for partial embedment in the head and body portion of a flexible plastic fishing lure such as a flexible plastic worm, which hook includes a straight shank fitted with a streamlined, low profile, double-tapered weight, an extended shank bend provided at one end of the straight shank to define an extended shank, with a reverse bend provided in the extended shank to define a reverse bend neck, hook top and hook barb. At the opposite end of the straight shank and above the weight there is provided a shank offset bend that defines a shank offset, a shank neck bend and a shank neck that terminates in a hook eye.

According to another embodiment, a curved shank weighted fish hook is provided for partial embedment in flexible plastic fishing lures such as flexible plastic worms, which fish hook includes a curved shank segment fitted with a streamlined, low profile, double-tapered weight. A reverse bend terminates one end of the curved shank to define a reverse bend neck, which terminates in a hook tip and a hook barb. The opposite end of the curved shank, like the straight shank weighted fish hook, terminates in a shank offset bend, a shank offset, a shank neck bend, and a shank neck, which terminates in a hook eye.

According to either the curved hook shank or the straight hook shank embodiment, the weight is located on the shank of the hook between the bend at one end of the hook shank and the hook eye at the opposite end of the hook shank. The preferred location of the weight will depend on the size of the hook and the amount of the weight.

BRIEF DESCRIPTION OF THE DRAWINGS

The invention will be better understood by reference to the accompanying drawings, wherein:

FIG. 5 is a side view of a straight shank weighted fish hook according to another embodiment.

FIG. 6 is a side view of the straight shank weighted fish hook illustrated in FIG. 5, more particularly showing the fish hook partially embedded in a flexible plastic fishing worm rigged in a weedless configuration;

FIG. 7 is a side view of a curved shank weighted fish hook according to another embodiment.

FIG. 8 is a side view of the curved shank weighted fish hook illustrated in FIG. 7, more particularly showing the fish hook partially embedded in a flexible plastic fishing lure in a weedless configuration.

DESCRIPTION OF THE PREFERRED EMBODIMENTS

Figure 1:
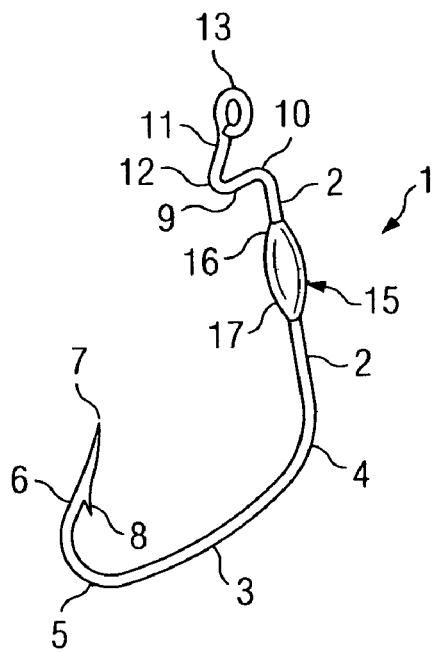
FIG. 1 is a side view of a straight shank weighted fish hook according to one embodiment.

In each of FIGS. 1–8, like reference numerals are used to refer to like parts of the hooks and lures illustrated therein.

Figure 2:
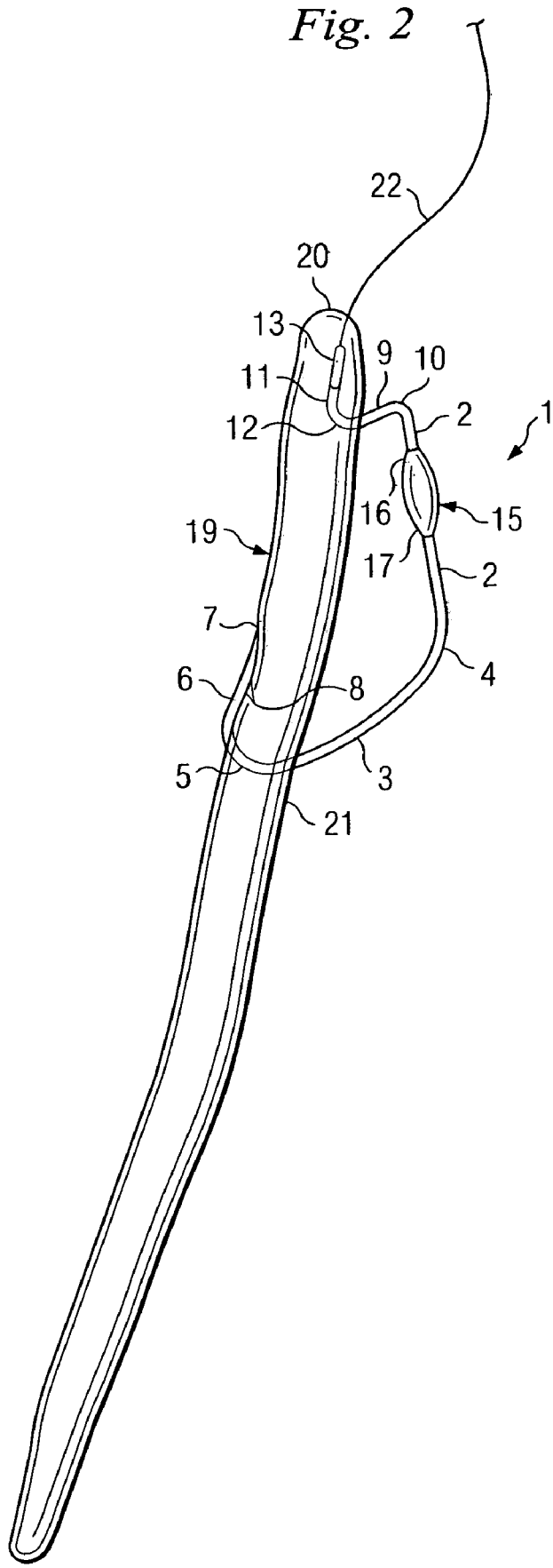
FIG. 2 is a side view of the straight shank weighted fish hook illustrated in FIG. 1, more particularly showing the fish hook partially embedded in a flexible plastic fishing worm rigged in a weedless configuration.

Referring initially to FIGS. 1 and 2 of the drawings in a first embodiment, a straight shank weighted fish hook is generally designated by reference numeral 1. The straight shank weighted fish hook 1 is characterized by a straight shank 2 that curves to define an extended shank 3 at an extended shank bend 4. The extended shank bend 4 continues, to define a reverse bend 5 and a reverse bend neck 6 extends from the reverse bend 5 and terminates at a sharp hook tip 7. An optional hook barb 8 is provided in the reverse bend neck spaced from the hook tip 7, as further illustrated in FIG. 1. The straight shank 2 continues in the opposite direction from the extended shank bend 4 to define a shank offset 9 at a shank offset bend 10 and the shank offset 9 curves at a shank neck bend 12 to define a shank neck 11, terminated by a hook eye 13, to which a fishing line 22 is tied, as illustrated in FIG. 2. A double-tapered, low profile weight 15, having a top weight taper 16 and a bottom weight taper 17, is provided such that the top weight taper 16 is spaced from, but near, the shank offset bend 10.

As further illustrated in FIG. 2, the straight shank weighted fish hook 1 is typically initially threaded through the lure head 20 of a plastic worm lure 19, with minimum lure head 20 damage, due to the top weight taper 16 and bottom weight taper 17 of the double-tapered weight 15, after the fishing line 22 is tied to the hook eye 13, such that the hook eye 13, the shank neck 11 and the shank neck bend 12 are embedded in the lure head 20 and the shank offset 9 extends from the lure head 20. The end of the straight shank weighted fish hook 1 comprising the reverse bend 5 and a portion of the extended shank 3 is then embedded in the lure body 21 of the plastic worm lure 19, as further illustrated in FIG. 2. In a preferred embodiment, this embedment is effected such that the reverse bend neck 6 typically extends alongside the soft plastic contour of the typically straight lure body 21 of the plastic lure 19 and the hook tip 7 terminates adjacent to, or is typically slightly embedded in, the lure body 21, along with the optional hook barb 8, to facilitate retrieval of the plastic worm lure 19 with the partially embedded straight shank weighted fish hook 1 through a waterbody and across and through obstacles such as moss and weeds and around or over submerged tree limbs and stumps and the like, in a weedless fashion without engaging the hook tip 7 with the underwater obstacles. Furthermore, as illustrated in FIG. 2, the extending portion of the shank offset 9, the shank offset bend 10, the straight shank 2, the double-tapered weight 15 and the extended shank bend 4, as well as a portion of the extended shank 3 are not embedded in the plastic worm lure 19. The double-tapered weight 15 is exposed to the waterbody and is positioned on the straight shank 2 to facilitate an optimum sinking rate and a natural swimming appearance of the plastic worm lure 19. As will be described further with respect to other embodiments disclosed herein, depending on the size of the hook and the weight of the double-tapered weight 15, the position of the double-tapered weight 15 on the shank 2 may vary. However, at least the top weight taper 16 of the double-tapered weight 15 will be positioned near the end of the hook shank having the hookeye 13, and preferably near a shank offset bend 10.

Figure 3:
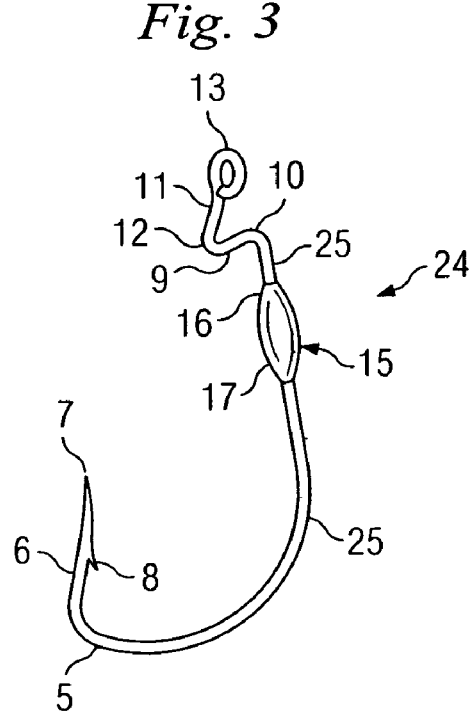
FIG. 3 is a side view of a curved shank weighted fish hook, according to another embodiment.
Figure 4:
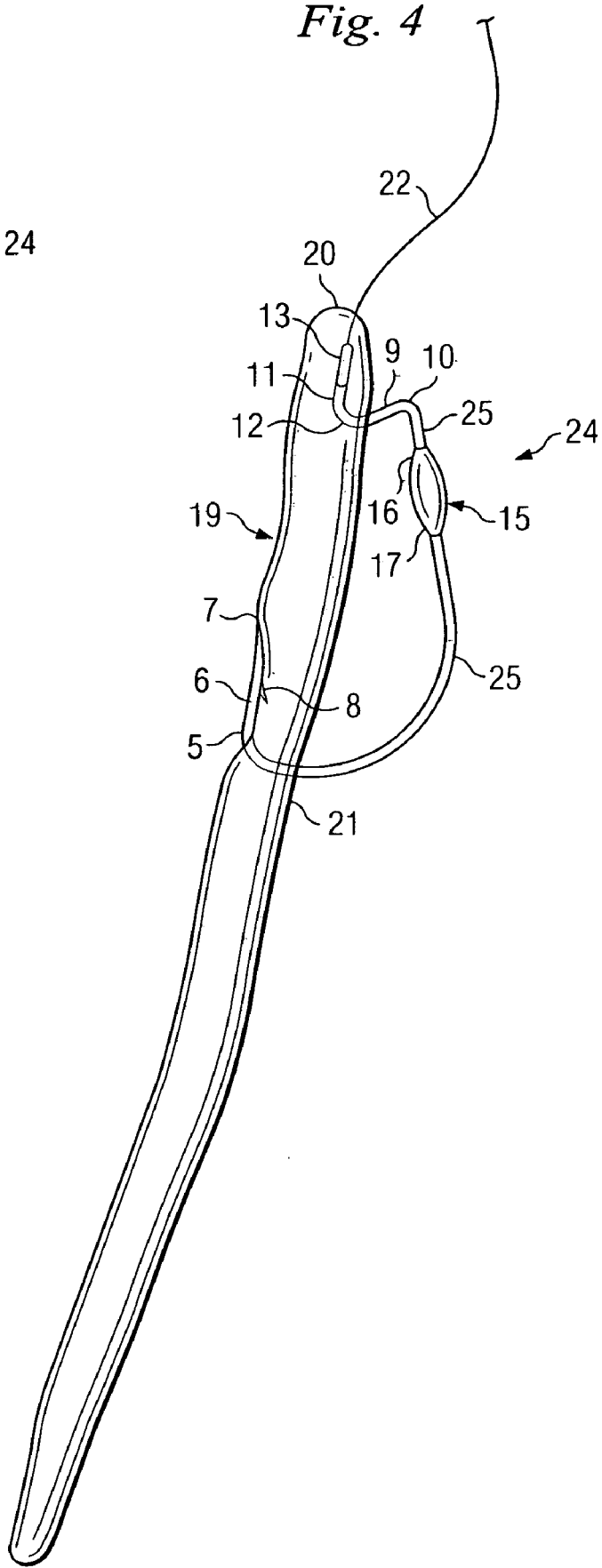
FIG. 4 is a side view of the curved shank weighted fish hook illustrated in FIG. 3, more particularly showing the fish hook partially embedded in a flexible plastic fishing lure in a weedless configuration.

Referring now to FIGS. 3 and 4, an embodiment comprising a curved shank weighted fish hook 24 is illustrated. The curved shank fish hook 24 comprises a curved shank 25 that extends at one end to define a reverse bend neck 6 at a reverse bend 5. As in the case of the straight shank weighted fish hook 1 illustrated in FIGS. 1 and 2, the reverse bend neck 6 in the curved shank weighted fish hook 24 terminates in a sharp hook tip 7 and in an optional hook barb 8, as illustrated. The curved shank 25 extends in the opposite direction from the reverse bend 5 to define a shank offset 9 at a shank offset bend 10 and includes a shank neck bend 12 and a shank neck 11, terminated by a hook eye 13 in the same manner as the straight shank weighted fish hook 1 illustrated in FIGS. 1 and 2. A low profile double-tapered weight 15 is provided on the curved shank 25, and has a top weight taper 16 and a bottom weight taper 17. The top weight taper 16 is situated near the shank offset bend 10, as illustrated in FIG. 3.

Referring again to FIG. 4, the curved shank weighted fish hook 24 is typically embedded in the lure head 20 and lure body 21 of the plastic worm lure 19 in essentially the same manner as the straight shank weighted fish hook 1, with minimum damage to the lure head 20, as described above. Accordingly, the reverse bend neck 6 and the hook tip 7 are typically positioned to lie alongside the lure body 21 of the plastic worm lure 19 to render the plastic worm lure 19 and curved shank weighted fish hook 24 essentially weedless as it is pulled through submerged weed beds and moss and over and around limbs, tree stumps and the like, by means of the fishing line 22 which is attached to a conventional reel (not illustrated). Further, as above described with respect to the straight shank weighted fish hook 1 illustrated in FIGS. 1 and 2, the plastic worm lure 19 is designed to sink at a natural rate of descent due to the position, size and shape of the double-tapered weight 15.

It will be appreciated by those skilled in the art that the straight shank weighted fish hook 1 and the curved shank weighted fish hook 24 can be constructed in any desired size or "number", as fish hooks are numbered in the art, with a double-tapered weight 15 (typically, but not necessarily constructed of lead) of corresponding size and weight provided on the straight shank 2 and the curved shank 25, respectively. For example, either of the straight shank weighted fish hook 1 or the curved shank weighted fish hook 24 can be made in sizes including but not limited to 3/0, 4/0 and 5/0 sizes. Similarly, double-tapered weight 15 can be provided in weights including but not limited to ½32 oz., ⅟16 oz., and 3/32 oz. Exemplary embodiments of a straight hook weighted shank and a curved hook weighted shank where at least the low-profile double-tapered weights are provided in a heavier weight are illustrated in FIGS. 4–8.

Referring now to FIGS. 5 and 6 of the drawings, another embodiment of a straight shank weighted fish hook is generally designated by reference numeral 100. As discussed with respect to the embodiment of a straight shank weighted fish hook 1 illustrated by FIG. 1, the straight shank weighted fish hook 100 illustrated in FIG. 5 is characterized by a straight shank 2 that curves to define an extended shank 3 at an extended shank bend 4. The extended shank bend 4 continues, defining a reverse bend 5 and a reverse bend neck 6. Reverse bend neck 6 extends from the reverse bend 5 and terminates at a sharp hook tip 7. An optional hook barb 8 is provided in the reverse bend neck spaced from the hook tip 7. The straight shank 2 continues in the opposite direction from the extended shank bend 4 to define a shank offset 9 at a shank offset bend 10. The shank offset 9 curves at a shank neck bend 12 to define a shank neck 11, terminated by a hook eye 13, to which a fishing line 22 is tied, as illustrated in FIG. 6. A double-tapered, low profile weight 150, having a top weight taper 160 and a bottom weight taper 170, is provided on the straight shank 2 such that the top weight taper 160 is spaced from, but near, the shank offset bend 10.

As illustrated in FIG. 5, the double-tapered weight 150 extends further along the shaft toward the extended shank bend 4 than the double-tapered weight 15, which could indicate that the weight of the double-tapered weight 150 is at the heavier end of weight, for example, 3/32 oz. In addition, the straight shank fish hook 100 illustrated in FIG. 5 could also be sized at the larger end of sizes, for example 5/0, to accommodate a heavier weight for the double-tapered weight 150.

As further illustrated in FIG. 6, the straight shank weighted fish hook 100 is typically initially threaded through the lure head 20 of a plastic worm lure 19 with minimum lure head 20 damage, due to the top weight taper 16 and bottom weight taper 17 of the double-tapered weight 15. The fishing line 22 is tied to the hook eye 13, and the hook eye 13, the shank neck 11 and the shank neck bend 12 are embedded in the lure head 20. The shank offset 9 extends from the lure head 20. The opposite end of the straight shank 2, which includes the reverse bend 5 and a portion of the extended shank 3, is then embedded in the lure body 21 of the plastic worm lure 19. In a preferred embodiment, this embedment is effected such that the reverse bend neck 6 typically extends alongside the soft plastic contour of the typically straight lure body 21 of the plastic lure 19 and the hook tip 7 terminates adjacent to, or is typically slightly embedded in, the lure body 21, along with the optional hook barb 8. This method of embedment facilitates retrieval of the plastic worm lure 19, with the straight shank weighted fish hook 100 partially embedded therein, through a waterbody, across and through obstacles such as moss and weeds, and around or over submerged tree limbs and stumps and the like, in a weedless fashion without engaging the hook tip 7 with the underwater obstacles. Furthermore, as illustrated in FIG. 6, the extending portion of the shank offset 9, the shank offset bend 10, the straight shank 2, the double-tapered weight 150 and the extended shank bend 4, as well as a portion of the extended shank 3 are not embedded in the plastic worm lure 19. The double-tapered weight 150 is exposed to the waterbody and is positioned on the straight shank 2 to facilitate an optimum sinking rate and a natural swimming appearance of the plastic worm lure 19.

Referring now to FIGS. 7 and 8, another embodiment of a curved shank weighted fish hook is generally designated by reference numeral 240. As discussed with respect to the embodiment of a curved shank weighted fish hook 24 illustrated by FIG. 3, the curved shank weighted fish hook 240 illustrated in FIG. 7 includes a curved shank 25 that extends at one end to define a reverse bend neck 6 at a reverse bend 5. The reverse bend neck 6 in the curved shank weighted fish hook 240 terminates in a sharp hook tip 7 an in an optional hook barb 8. The curved shank 25 extends in the opposite direction from the reverse bend 5 to define a shank offset 9 at a shank offset bend 10, and includes a shank neck bend 12 and a shank neck 11, terminated by a hook eye 13. A low profile double-tapered weight 150 is provided on the curved shank 25, and includes a top weight taper 160 and a bottom weight taper 170. The top weight taper 160 is situated a near the shank offset bend 10, as illustrated in FIG. 7.

Referring now to FIG. 8, the curved shank weighted fish hook 240 is typically embedded in the lure head 20 and lure body 21 of the plastic worm lure 19 in essentially the same manner as described above. Accordingly, the reverse bend neck 6 and the hook tip 7 are typically positioned to lie alongside the lure body 21 of the plastic worm lure 19 to render the plastic worm lure 19 and curved shank weighted fish hook 240 essentially weedless as it is pulled through submerged weed beds and moss and over and around limbs, tree stumps and the like, by means of the fishing line 22 which is attached to a conventional reel (not illustrated). Further, and previously described, the plastic worm lure 19 is designed to sink at a natural rate of descent due to the position, size and shape of the double-tapered weight 150.

Regardless of the selected size or weight of the double-tapered weights 15 and 150, double-tapered weights 15 and 150 are provided with a top weight taper 16 and 160, respectively, and a bottom weight taper 17 and 170 respectively, to facilitate weedless action of the plastic worm lure 19 illustrated in FIGS. 2, 4, 6 and 8, as well as streamlined retrieval.

Referring now to all of FIGS. 1–8, when the straight shank weighted fish hooks 1 and 100, and curved shank weighted fish hooks 24 and 240, are partially embedded in the plastic worm lure 19 as illustrated in FIGS. 2, 4, 6 and 8, and the fishing line 22 is tied to each hook eye 13 prior to such embedment, it will be appreciated by those skilled in the art that each hook and lure combination may be cast from a casting rod and reel (not illustrated) upon which reel and fishing line 22 is wound. The plastic worm lure 19 with embedded straight shank weighted fish hooks 1 and 100, and with embedded curved shank weighted fish hooks 24 and 240, respectively, can be retrieved through a waterbody, either on the surface, on the bottom or at a selected depth, since the plastic worm lure 19 will sink naturally as a result of the double-tapered weight 15.

Furthermore, under circumstances where the straight shank weighted fish hooks 1 and 100 and curved shank weighted fish hooks 24 and 240 encounter moss, weeds or underwater obstacles such as limbs and the like, the top weight tapers 16 and 160, and the bottom weight tapers 170 on the double-tapered weights 15 and 150 in each case, facilitate a low profile for easy slipping through the weeds or moss, and over and around limbs to minimize entanglement of the plastic worm lure 19, the straight shank weighted fish hooks 1 and 100, and the curved shank weighted fish hooks 24 and 240 in the underwater obstacles. This streamlined, low profile of the double-tapered weights 15 and 150 in each case also facilitates a more natural retrieval of the plastic worm lure 19, since it offers minimum resistance to water pressure and does not materially interfere with the natural "swimming" action and movement of the plastic worm lure 19 through the water.

Referring again to the drawings, it will be appreciated by those skilled in the art that a primary consideration of the straight shank weighted fish hooks 1 and 100, and the curved shank weighted fish hooks 24 and 240, is the positioning and location, as well as the streamlined profile and shape of the double-tapered weights 15 and 150 in each case. The double-tapered weights 15 and 150 include a top weight taper 16 and 160, respectively, and a bottom weight taper 17 and 170 respectively. Furthermore, the position of the double-tapered weights 15 and 150, where the top weight tapers 16 and 160 in each case terminate slightly below the shank offset bend 10 in the straight shank weighted fish hooks 1 and 100 illustrated in FIGS. 1 and 5, and slightly below the shank offset bend 10 in the curved shank weighted fish hooks 24 and 240 illustrated in FIGS. 3 and 7 facilitates an optimum angle of position and rate of descent as the plastic worm lure 19 sinks in a waterbody, which makes the lure attractive to fish.

Accordingly, when cast and before retrieval, the plastic worm lure 19 illustrated in FIGS. 2, 4, 6 and 8 will not dive rapidly toward the water bottom, nor will it float tail down or horizontally toward the waterbody, but it will slowly sink with the lure head 20 positioned in a naturally-appearing, downward position and the lure body 21 following in an optimum undulating simulated swimming action designed to attract fish. Moreover, the low profile configuration of the exposed (i.e., not embedded in the lure 19) double-tapered weights 15 and 150 does not interfere with the naturally-appearing "swimming" action of the plastic worm lure 19 during all types of retrieval.

It will be further appreciated by those skilled in the art that either of a straight shank or a curved shank fish hook of the embodiments disclosed herein may be mounted on a wide variety of plastic fishing lures, including worms, lizards, grubs, crawfish, shad and other lures and baits of all descriptions, in non-exclusive particular, typically, but not necessarily, in the manner illustrated in FIGS. 2, 4, 6 and 8 of the drawings. Accordingly, as desired, the straight shank weighted fish hooks 1 and 100, curved shank weighted fish hooks 24 and 240, may be adjusted in the lure head 20 and lure body 21 of the plastic worm lure 19, such that the hook tip 7 penetrates the lure body 21 to insure that both the hook tip 7 and the hook barb 8 are hidden and free from entanglement in or snagging on underwater obstacles while the plastic worm lure 19 is retrieved.

While the preferred embodiments of the invention have been described above, it will be recognized and understood that various modifications may be made in the invention and the appended claims are intended to cover all such modifications which may fall within the spirit and scope of the invention.

What is claimed is:

1. A lure comprising
   a lure body;
   a hook at least partially embedded in said lure body, said hook comprising;
      a hook shank;
      a bend portion having a first end and a second end provided in one end of said hook shank;
      a hook tip terminating said first end of said bend portion;
      a hook eye provided on an opposite end of said hook shank from said bend;
      a shank offset bend provided on said hook shank between said second end of said bend portion and said hook eye;
      shank offset extending from said shank offset bend toward said hook eye;
      a shank neck bend extending from said shank offset toward said hook eye;
      a shank neck terminated by said hook eye;
      a substantially straight shank portion extending between said shank offset bend and said second end of said bend portion; and
      a weight concentrically disposed about said substantially straight shank portion, said weight having a middle portion, a first end and a second end, wherein said weight symmetrically tapers from said middle portion to said first and second ends thereof, respectively and where said first end of said weight is closer to said hook eye than to said hook tip;
   wherein said hook eye, said shank neck, and said shank neck bend are at least partially embedded in said lure body.

2. The lure of claim 1 wherein said hook further comprises:

a reverse bend provided in said bend, wherein said hook tip terminates said reverse bend.

3. The lure of claim 2 wherein said reverse bend is at least partially embedded in said lure body.

4. The lure of claim 2 wherein said reverse bend extends alongside said lure body.

5. The lure of claim 2 wherein said hook further comprises a barb provided in said reverse bend.

6. The lure of claim 5 wherein said barb is spaced from said hook tip.

7. The lure of claim 5 wherein said barb is at least partially embedded in said lure body.

8. The lure of claim 5 wherein said barb extends alongside said lure body.

9. The lure of claim 1 wherein said shank offset, said shank offset bend, and said weight are not embedded in said lure body.

10. The lure of claim 1 further comprising a fishing line tied to said hook eye.

11. The lure of claim 1 wherein said weight is not embedded in said lure body.

* * * * *